United States Patent Office

Re. 26,942
Reissued Aug. 25, 1970

26,942
COCRYSTALLIZED CATALYST PREPARATION PROCESS

Erik Tornqvist, Roselle, and Arthur W. Langer, Jr., Watchung, N.J., assignors to Esso Research and Engineering Company, a corporation of Delaware No Drawing. Original No. 3,130,003, dated Apr. 21, 1964, Ser. No. 19,176, Apr. 1, 1960, which is a continuation of application Ser. No. 532,513, Feb. 16, 1966. Application for reissue May 16, 1969, Ser. No. 827,112
Int. Cl. C01g *23/02*
U.S. Cl. 23—87 13 Claims

Matter enclosed in heavy brackets [ ] appears in the original patent but forms no part of this reissue specification; matter printed in italics indicates the additions made by reissue.

*ABSTRACT OF THE DISCLOSURE*

*An olefin polymerization catalyst component is produced by intensely milling together in the absence of diluent a partially reduced transition metal halide (such as $TiCl_3$) and a group II or III metal halide (such as $AlCl_3$).*

*This application is a continuation of S.N. 532,513, filed Feb. 16, 1966, and now abandoned.*

This invention relates to polymerization catalysts and more particularly to polymerization catalysts useful for the low pressure polymerization and copolymerization of alpha olefins.

Prior to the present invention, it was found that ethylene and other olefins such as propylene, butylene, isobutylene and the like can be polymerized and copolymerized at relatively low pressures not substantially exceeding atmospheric pressure in a liquid reaction medium when using various combinations of reducing metals or metal compounds, e.g., alkali and alkaline earth metals, their hydrides and alloys; aluminum compounds, such as aluminum hydrides, aluminum alkyls, e.g., aluminum trialkyls, alkyl aluminum halides and the like with various reducible heavy metal compounds, such as the halides, acetyl acetonates, and the like of the metals of groups IV through VI and VIII of the periodic table, e.g. of titanium, zirconium, vanadium, chromium, molybdenum and iron. See, e.g., Belgian Patent 533,362; "Chemical and Engineering News," April 8, 1957, pages 12 through 16, and "Petroleum Refiner," December 1956, pages 191 through 196.

Prior to the present invention, it was also discovered that catalyst systems made up of a preformed partially reduced transition metal halide cocrystallized with a group II or III metal halide is a much more active alpha olefin polymerization catalyst component than the preformed partially reduced transition metal halide containing no cocrystallized group II or III metal halide. Additionally, it was found that dry milling the cocrystallized catalyst component produces a catalyst component which, when activated with an organo metallic compound, is a highly active catalyst for all alpha olefins, giving very high polymerization rates and high catalyst efficiencies.

It has now been found that cocrystallization of a preformed partially reduced transition metal halide with a group II or III metal halide can be obtained by intensely milling the preformed partially reduced transition metal halide with the group II or III metal halide when the milling is carried out in a steel ball mill. The activity of the cocrystallized catalyst component of the invention is much greater than that of the correspondnig preformed partially reduced transition metal halide, which has been steel ball milled alone for an identical period of time. By contrast, no increase in catalyst activity is obtained when separately ball-milled group II or III metal halide is added to and thoroughly mixed with the pure ball milled transition metal halide as long as the mixing does not involve the intense grinding of this invention.

The partially reduced transition metal halides that are dry ball-milled prior to activation with an organo-metallic compound are the halides, such as the iodides, bromides, and preferably the chlorides, of the transition metals of the IV–B, V–B, VI–B and VIII groups of the periodic system according to "Fundamental Chemistry," 2nd Ed., by H. G. Deming, John Wiley & Sons Inc., such as titanium, zirconium, thorium, vanadium, tantalum, molybdenum and tungsten. The term "partially reduced" transition metal halides is to be understood to mean transition metal halides in which the transition metal components have a valence at least one unit below their normal maximum valence. The group II or III metal halide cocrystallized with the preformed partially reduced transition metal halide preferably contains the same halogen as the latter. Thus in the case of a transition metal chloride, the group II or III halide is preferably a chloride such as aluminum chloride, gallium chloride, or beryllium chloride; with aluminum chloride preferred. Titanium trichloride is preferred herein, especially the purple crystalline modifications $TiCl_n$ where n is a number between two and three can also be used. The partially reduced transition metal halide is mixed with a group II or III metal halide in the range of from 0.05 to 1.0, preferably 0.1 to 0.5, and more preferably 0.2 to 0.33 mole of the group II or III metal halide per mole of partially reduced transition metal halide.

The partially reduced heavy transition metal halides can be prepared by any procedure known to the art and the preparation of these compounds is not within the scope of the invention. However, two of the methods known for preparing the preferred metal halides, i.e., partially reduced titanium chlorides are summarized below:

(1) Metal reduction of titanium tetrachloride with titanium powder in the absence of solvent at elevated temperatures.
(2) Hydrogen reduction of titanium tetrachloride at temperatures above about 650° C.

The milling process of the invention is carried out by placing the dry preformed partially reduced transition metal halide and the group II or III metal halide in ball milling equipment and milling the metal halide in the absence of diluents in an inert atmosphere, such as nitrogen or argon atmosphere, which is free of oxygen, water vapor, and other catalyst poisons for a period of time sufficient to cocrystallize the two components and substantially increase the activity of the transition metal halide in the polymerization reaction when activated with an organo-metallic compound. It was found, however, that the use of a grinding medium of density greater than 3 g./ml., such as steel balls, was necessary, and that the use of flint pebbles even for periods of 17 days did not form the cocrystallized compounds of the invention. The optimum time period for the dry milling step depends in general on the efficiency of the equipment used and the particular preformed partially reduced transition metal halide used. Ball milling times of from about 2 to 20 days were used herein. The time period most suitable for any given milling equipment can easily be determined by routine experimentation.

Based on this discovery, one should of course be able to devise grinding equipment which can utilize grinding materials of lower than 3 g./ml. density, e.g., the effective density could be increased by utilizing centrifugal force or high velocity impact.

It was proved by vacuum sublimation that surprisingly, true cocrystallization of the partially reduced transition metal halide and the group II or III metal halide takes place under the conditions described. Further proof of the cocrystallization was given by the highly increased polymerization rate obtained with the product of this invention as compared with a similarly ball milled partially reduced transition metal halide alone or a simple mixture of the two components ball milled separately. It was quite surprising, and actually contrary to what normally would be expected, to discover that true cocrystallization of the two components could be obtained by a physical method such as intense ball milling.

The dry milled preformed partially reduced transition metal halide cocrystallized with the group II or III metal halide is removed from the milling equipment at the end of the milling period and activated with an organometallic compound in an inert diluent. The organometallic compounds useful in the present invention for activating the dry milled metal halides are organometallic compounds of the metals of groups I to III of the periodic system. Particularly valuable are alkyl aluminum compounds, especially trialkyl aluminum compounds such as triethyl aluminum, tripropyl aluminum, triisobutyl aluminum, and the like, and dialkyl aluminum compounds such as diethyl aluminum halides, e.g., diethyl aluminum chloride, dipropyl aluminum chloride, diisobutyl aluminum chloride, and the like. Monoalkyl aluminum halides can also be used. Additionally, organoaluminum compounds having one or two hydrocarbon radicals and two or one electron attracting groups such as alkoxy, organic nitrogen or sulfur groups can also be used. Triethyl aluminum is particularly preferred herein.

The dry milled cocrystallized metal halide catalyst component is treated in a non-oxidizing atmosphere in an inert diluent with one or more of the above organo-metallic compounds in a mole ratio of 0.1 to 6 mols of organometallic compound per mole of dry milled metal halide at a temperature in the range of 25° to 135° C. The temperature is not critical here although elevated temperatures which will result in decompositions of either or both of the components should, of course, not be used.

The inert diluents suitable as a medium for the activation of the dry milled metal halides include aliphatic hydrocarbons such as n-hexane, n-heptane and n-decane and aromatic hydrocarbons such as benzene, toluene, xylene, halogenated hydrocarbons such as chlorobenzene, and the like, with an aromatic diluent, particularly xylene, being preferred.

The dry milled cocrystallized preformed partially reduced transition metal halide component after being activated with an organo-metallic compound is used to homopolymerize alpha olefins containing two or more carbon atoms and to copolymerize alpha olefins such as ethylene and propylene. The homopolymerization of alpha olefins such as for example propylene, butene-1, heptene-1, dodecene-1, and the like and the copolymerization of two or more alpha olefins such as mixtures of ethylene and propylene, ethylene and butene-1, propylene and butene-1, and the like, is carried out by contacting the desired olefin feed with the activated dry milled metal halide in a hydrocarbon solvent at a temperature of from 0°, to about 100° C., preferably 50 to 90° C., and at pressures ranging from sub-atmospheric to 150 p.s.i.g., preferably atmospheric pressure, in batch or continuous operation. The catalyst slurry is preferably diluted with additional diluent to provide a catalyst concentration for the polymerization of about 0.1 to 0.5 wt. percent based on the weight of the diluent present. The polymer product concentration in the polymerization reaction mixture can range between about 1 to 20 wt. percent based on the total contents present. It should be noted that the polymerization process of this invention allows the use of more concentrated polymer slurries than are practical in prior art processes. When the desired degree of polymerization has been obtained, a $C_1$ to $C_8$ alkanol such as isopropyl alcohol or n-butyl alcohol, desirably in combination with a chelating agent such as acetyl acetone or diacetyl, is added to the reaction mixture to dissolve and deactivate the catalyst and to precipitate the polymer product from solution. The polymer product is then filtered and can be further washed with alcohol or an acid such as hydrochloric acid and dried, compacted and packaged. It is important that the polymerization reaction be carried out in the absence of catalyst poisons such as water, oxygen, sulfur compounds, and the like. The activated dry milled metal halide catalyst of the invention can be added to the olefin-saturated diluents at polymerization temperature without encountering reactor fouling. This is surprising and is of particular importance in continuous polymerization reactions where a direct addition of catalyst to the reactor at polymerization temperatures is highly advantageous.

The invention will be better understood from the following examples.

EXAMPLE I 308.6 grams (2 moles) of a $TiCl_3$ catalyst component which had been prepared by the reduction of $TiCl_4$ with hydrogen at about 700° C. was ball-milled for seven days with chrome alloy steel balls in a ½ gallon jar with 26.7 grams (0.2 mole) of $AlCl_3$ (*anhydrous*). At the end of seven days, the product was recovered from the ball mill, 0.42 gram of the product was added to 100 ml. of xylene in an addition funnel and activated with 0.54 gram of $AlEt_3$. After about 15 minutes the catalyst slurry was added to a glass polymerization unit containing 900 ml. xylene satuarted wtih propylene at 60° C. and equipped with a stirrer and a dip tube for continuous introduction of monomer. The temperature was brought to 75° C. within 10 minutes and the polymerization continued at this temperature for an additional 50 minutes under continued monomer addition and good stirring. After one hour of total polymerization time, the reaction was terminated and the polymer precipitated by the addition of 2 volumes of isopropanol containing 3 ml. of acetylacetone, and the precipitated polymer filtered. The filtered polymer was given a second isopropanol wash, filtered again and dried in a vacuum oven. The details of the catalyst preparation, the polymerization reaction, and the polymer yield and properties are given in Table I together with data from a similarly ball milled sample of $TiCl_3$ which had been milled in the absence of aluminum chloride.

Table I

EFFECT OF BALL MILLING $TiCl_3$ WITH $AlCl_3$ ON ACTIVITY IN ATMOSPHERIC PRESSURE PROPYLENE POLYMERIZATIONS

| Catalyst | Example | | | | | | |
|---|---|---|---|---|---|---|---|
| | | I | II | III | IV | | V |
| $TiCl_3.nAlCl_3$, Composition | $TiCl_3$ | $TiCl_3.0.1$ $AlCl_3$ | $TiCl_3.0.2$ $AlCl_3$ | $TiCl_3.0.33$ $AlCl_3$ | $TiCl_3.0.5AlCl_3$ | | $TiCl_3$. $AlCl_3$ |
| Ball Milling Time, Days | | | | | | | |
| Weight, g | 0.386 | 0.420 | 0.453 | 0.500 | 0.553 | 0.553 | 0.718 |
| $AlEt_3$, g | 0.57 | 0.54 | 0.51 | 0.475 | 0.428 | 0.570 | 0.855 |
| Al/Ti Ratio (a) | 2 | 2 | 2 | 2 | 2 | 2.5 | 3 |
| Catalyst Concentration, g/l | 0.96 | 0.96 | 0.96 | 0.98 | 0.98 | 1.12 | 1.57 |
| Polymerization Results: | | | | | | | |
| Yield, g | 52.8 | 98.8 | 132.0 | 131.8 | 47.9 | 74.4 | 21.5 |
| Waxy Polymer, Percent | 6.6 | 5.0 | 5.4 | 3.6 | 4.4 | 3.9 | 6.1 |
| Catalyst Efficiency, g./g | 55.5 | 102.9 | 137.0 | 135.3 | 48.9 | 66.3 | 13.7 |
| Properties of Solid Polymer: | | | | | | | |
| Molecular Weight$\times 10^{-3}$ (b) | 185 | 210 | 215 | 195 | 160 | 205 | 185 |
| Density, g./ml | 0.9002 | 0.8993 | 0.8993 | 0.8976 | 0.8926 | 0.8969 | 0.8956 |
| M.P., ° C | 168 | 161 | 160 | 160 | 160 | 162 | 162 |
| Tensile Strength, p.s.i. | 4,780 | 4,470 | 4,380 | 4,390 | ---- | 3,910 | ---- |
| Elongation, Percent | 160 | 150 | 400 | 50 | ---- | 110 | ---- |
| Ash, Percent | 0.024 | 0.008 | 0.022 | 0.009 | 0.057 | 0.013 | ---- |

(a) Includes $AlCl_3$ in $TiCl_3.nAlCl_3$ preparations.
(b) According to the Harris correlation, J. Polymer Science, 8,360 (1952).

EXAMPLES II THROUGH V $TiCl_3.nAlCl_3$ catalyst components were prepared and tested according to the process of Example I. The value of n for Examples II through V varied from 0.2 to 1 as shown in Table I. The details of the catalyst preparation and the use of the catalyst to polymerize propylene are also given in Table I.

It can be seen from above Table I that the cocrystallized catalysts of Examples I through IV had higher catalyst efficiencies and smaller quantities of waxy polymer than that of $TiCl_3$ steel ball-milled in the absence of aluminum chloride. Surprisingly, this increased catalyst efficiency was obtained at essentially no sacrifice of polymer properties. Example V, which exhibited a much lower catalyst efficiency than any of the other examples, shows that the ratio of aluminum chloride to $TiCl_3$ should be kept below 1 when the degree of grinding is equal to or lower than that employed in Examples I–V.

EXAMPLE VI

In order to demonstrate the applicability of the process of the invention with systems other than titanium halides, 157.2 grams (1 mole) of $VCl_3$ were steel ball milled in a quart jar with 44.4 grams (⅓ mole) of $AlCl_3$ in accordance with the process of Example I. Details of the catalyst preparation and the polymerization of propylene using the catalyst are given in Table II together with a sample of $VCl_3$ ball milled for seven days in the absence of $AlCl_3$ for comparison purposes.

Table II

ATMOSPHERIC PRESSURE PROPYLENE POLYMERIZATION, XYLENE DILUENT, POLYMERIZATION TIME 2 HOURS

| Catalyst | $VCl_3$ | $VCl_3.0.33$ $AlCl^3$ |
|---|---|---|
| $VCl_3.nAlCl_3$ Components: | | |
| Balling milling time, days | 7 | 7 |
| Weight, g | 0.393 | 0.504 |
| $AlEt_3$, g | 0.57 | 0.475 |
| Catalyst Concentration, g/l | 0.96 | 0.98 |
| Polymerization Results: | | |
| Yield, g | 28.2 | 37.0 |
| Waxy polymer, percent | 8.5 | 4.9 |
| Catalyst Efficiency, g./g | 29.3 | 37.8 |

EXAMPLE VII 1.543 grams (10 moles) of $TiCl_3$ and 133.3 grams (1 mole) of $AlCl_3$ were milled together in a 2¼ gallons flint pebble mill for seventeen days. However, no improvement in catalyst activity was obtained compared to that of a sample of $TiCl_3$ which had been flint pebble milled alone under the same conditions for 18 days.

This example demonstrates that flint pebble mills are not satisfactory for making the cocrystallized catalyst components of the invention.

EXAMPLE VIII

A $TiCl_3$—$AlCl_3$ catalyst was prepared by mixing calculated amounts of $TiCl_3$ and $AlCl_3$ which had been steel ball milled separately for six days. A 0.5 gram aliquot of the mixture was then used for polymerization of propylene exactly as described in Example III. The catalyst activity proved to be lower than for the pure steel ball milled TiCl tested under corresponding conditions (Table I), i.e., 38.2 vs. 55.5 g./g. This further demonstrates the importance of intensely grinding the two solid components together.

In order to demonstrate that the cocrystallized catalyst components of the invention are not simply mixtures of partially reduced transition metal halide and group II or III metal halide, vacuum sublimation was applied to the ball milled $TiCl_3 \cdot 0.33\ AlCl_3$ mixture tested in Example III and a similar mixture of $TiCl_3$ and $AlCl_3$ which had been prepared by shaking for three days. With the mixture formed by shaking, essentially all of the $AlCl_3$ was lost by vacuum sublimation at 5 mm. of mercury for 4 hours at 180° C., while essentially none of the $AlCl_3$ was lost from the steel ball mixed sample.

Variations in the process of the invention can be carried out without departing from the scope or spirit of the invention. Additionally the examples have been given for illustration purposes only and are not meant to limit the invention.

What is claimed is:

1. The process for the preparation of a catalyst component useful in the polymerization of alpha olefins comprising intensely milling together in the absence of diluent and with a grinding medium having an effective density higher than 3 g./ml., a mixture which consists essentially of a partially reduced transition metal halide of the transition metals of groups IV–B, V–B, VI–B, and VIII of the periodic system and a metal halide of a metal of groups II or III of the periodic system; from 0.05 to 1.0 mole of the metal halide of groups II and III being employed per mole of partially reduced transition metal halide.

2. The process of claim 1 wherein steel balls were employed as the grinding medium.

3. The process of claim 1 wherein the intense ball milling is carried out for from 2 to 20 days.

4. The process of claim 1 wherein the partially reduced transition metal halide is a titanium halide and the metal halide of groups II and III is an aluminum halide.

5. The process of claim 1 wherein the partially reduced transition metal halide is a titaninum chloride and the metal halide of groups II and III is aluminum chloride.

6. The process of claim 1 wherein from 0.1 to 0.5 mole of metal halide are employed per mole of partially reduced transition metal halide.

7. The process of claim 1 wherein the transition metal halide is a vanadium halide and the metal halide in groups II and III is an aluminum halide.

8. The process of claim 1 wherein the partially reduced transition metal halide is a vanadium chloride and the metal halide of groups II and III is aluminum chloride.

*9. Method of preparing $TiCl_3$ for use in combination with a cocatalyst selected from the group consisting of aluminum alkyls and aluminum alkyl halides in the low pressure polymerization of olefins which consists essentially in grinding a mechanical mixture of $TiCl_3$ and an aluminum halide in the absence of a diluent, said grinding being accomplished with the use of a grinding medium, having an effective density greater than 3 g./ml.*

*10. Method in accordance with claim 9, wherein the aluminum halide is $AlCl_3$.*

*11. Method in accordance with claim 9, wherein the aluminum halide is anhydrous $AlCl_3$.*

*12. Method in accordance with claim 11, wherein the grinding is carried out under an inert atmosphere.*

*13. Method in accordance with claim 12, wherein the $AlCl_3$ constitutes about 10–50% by weight of the $TiCl_3$.*

References Cited

The following references, cited by the Examiner, are of record in the patented file of this patent or the original patent.

UNITED STATES PATENTS

| | | |
|---|---|---|
| 2,893,984 | 8/1959 | Seelbach et al. |
| 2,956,989 | 10/1960 | Jezl. |
| 3,032,510 | 5/1962 | Tornqvist et al. |
| 3,069,364 | 12/1962 | D'Alelio. |

FOREIGN PATENTS

| | | |
|---|---|---|
| 1,132,506 | 11/1956 | France. |

PATRICK P. GARVIN, Primary Examiner

U.S. Cl. X.R.

252—429, 442; 260—88.2, 93.7, 94.8, 94.9